No. 669,922. Patented Mar. 12, 1901.
J. GOTTLOB.
MEANS FOR THE PREVENTION OF INCRUSTATION IN BOILERS.
(Application filed Feb. 3, 1900.)
(No Model.)
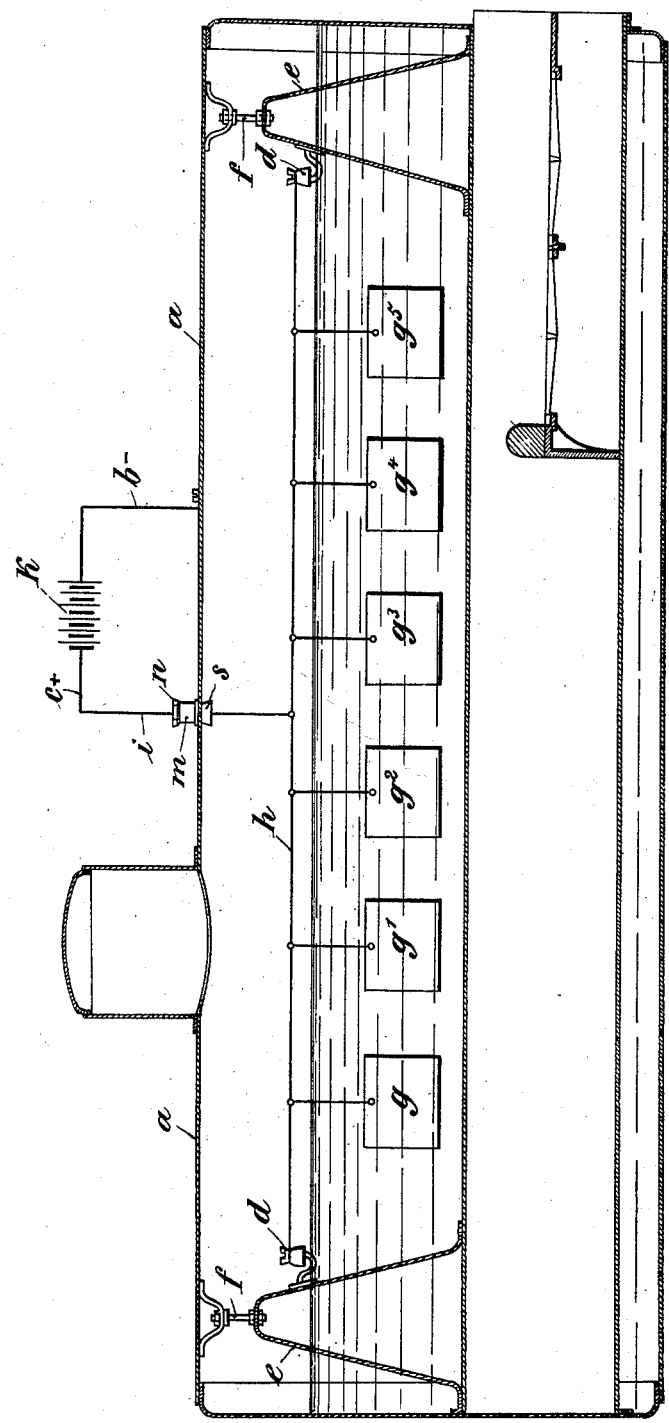

UNITED STATES PATENT OFFICE.

JACOB GOTTLOB, OF COLOGNE, GERMANY.

MEANS FOR THE PREVENTION OF INCRUSTATION IN BOILERS.

SPECIFICATION forming part of Letters Patent No. 669,922, dated March 12, 1901.

Application filed February 3, 1900. Serial No. 3,812. (No specimens.)

*To all whom it may concern:*

Be it known that I, JACOB GOTTLOB, electrical engineer, a subject of the King of Prussia, German Emperor, residing at 29 Aquinenstrasse, Cologne-on-the-Rhine, in the Kingdom of Prussia and Empire of Germany, have invented certain new and useful Improvements in Means for Preventing Incrustation of Boilers, of which the following is a full, clear, and exact description.

This invention relates to means for the prevention of incrustation or the collection of scale in boilers, whereby the scale forming on the boiler-walls is by the employment of electricity removed from such walls and precipitated at the bottom of the boiler in the condition of a muddy deposit.

The device mainly consists in the arrangement, in a special and advantageous manner, upon standards rising within the boiler and fitted with insulators, of electrodes connected to the positive pole of a battery or machine. The electrodes are suspended by wires in such a position that the electrodes only are immersed in the water of the boiler. The negative pole of the battery, whereof the positive pole is situated at the electrodes, is jointed onto the boiler-wall, so that the scale forming on such wall is by the current from the battery precipitated to the bottom of the boiler in the condition of a muddy sediment. The positive connecting-wire, which must necessarily be inserted into the boiler in an insulated condition, is supported on the boiler-wall by means of a piece of porcelain surrounded by an outer metal casing, and, further, by a porcelain plate or disk adapted by its shape to serve the purpose of an insulator, a perfectly steam-tight joint and reliable insulation being thus secured.

In the accompanying drawing the improvement is illustrated as applied to a boiler, of which a longitudinal section is shown.

$a$ is the boiler, wherein the standards $e\ e$, preferably of iron, are secured in position by means of screws $f\ f$, which serve to adjust the standards to fit the inside of the boiler. Upon the standards are provided insulators $d\ d$, between which a wire $h$ is stretched. The arrangement of the insulators is such that the wire stretched between them above the surface of the water in the boiler and does not touch the water. From the wire $h$ electrodes, such as $g\ g'\ g^2\ g^3\ g^4\ g^5$, preferably of zinc, are suspended, so as to be immersed in the water contained in the boilers. The wire $h$ is connected with the positive pole $c$ of a battery $k$ by means of an insulated conductor $i$. The positive connecting-wire $i$ is passed through the wall of the boiler, being supported therein and insulated therefrom by a suitable insulator $m$. The inner end of this wire is connected to the wire $h$, from which the positive terminal plates $n$, electrodes $g\ g'$, &c., are suspended.

What I claim, and desire to secure by Letters Patent, is—

The combination with a steam-boiler of a continuous-current-energizing circuit having its negative wire connected to the boiler and its positive connecting-wire passing through and insulated from the boiler, of standards within the boiler and supported by engagement with the boiler-wall, insulators supported from said standards, a wire stretched between said insulators above the water-level in the boiler, and connected to the aforesaid positive connecting-wire and electrodes suspended from the aforesaid stretched wire, substantially as set forth.

In witness whereof I subscribe my signature in presence of two witnesses.

JACOB GOTTLOB.

Witnesses:
 WILLIAM H. MADDEN,
 L. BARNES.